Inglis & Spencer, 3 Sheets, Sheet. 3.

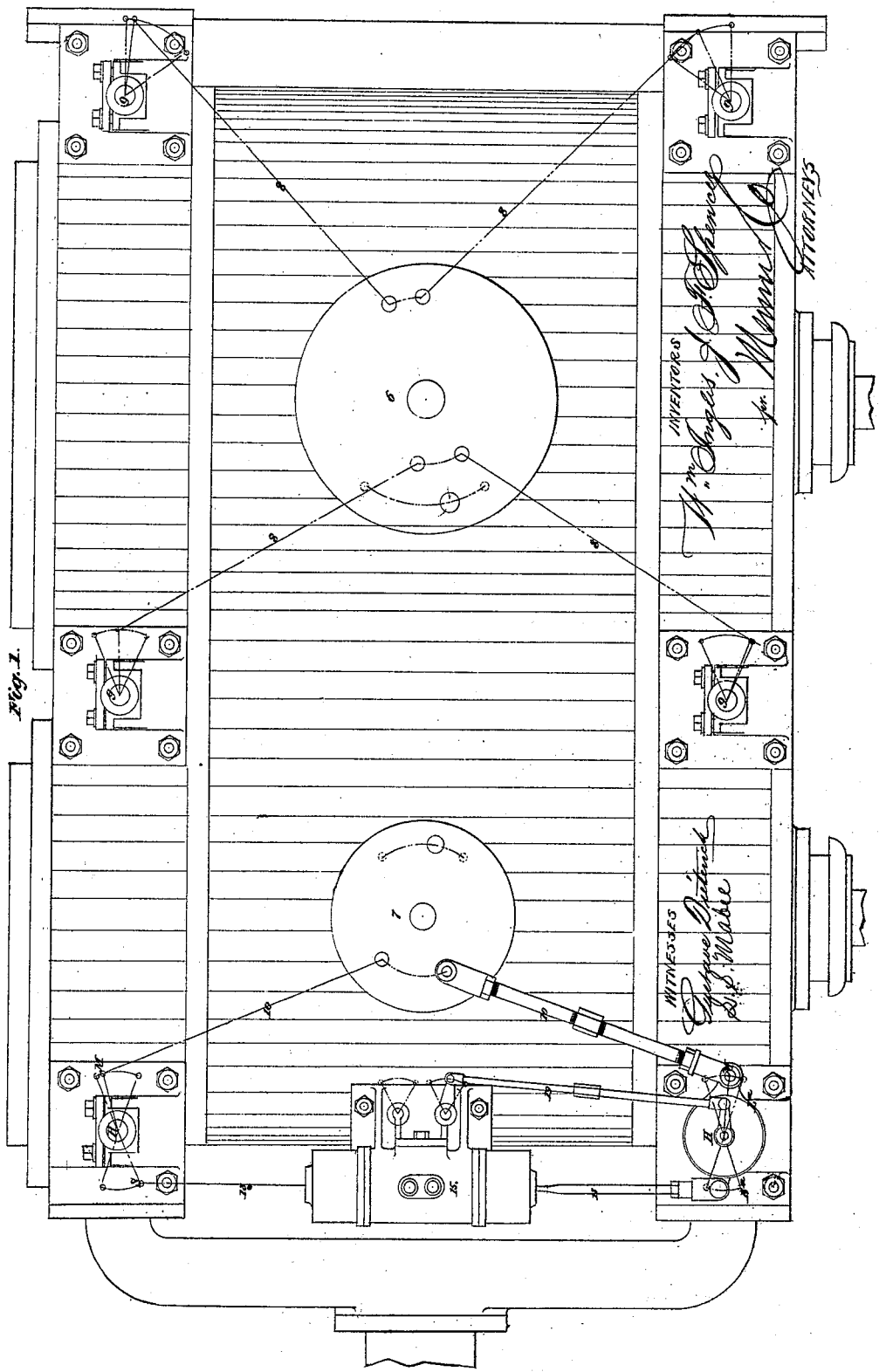

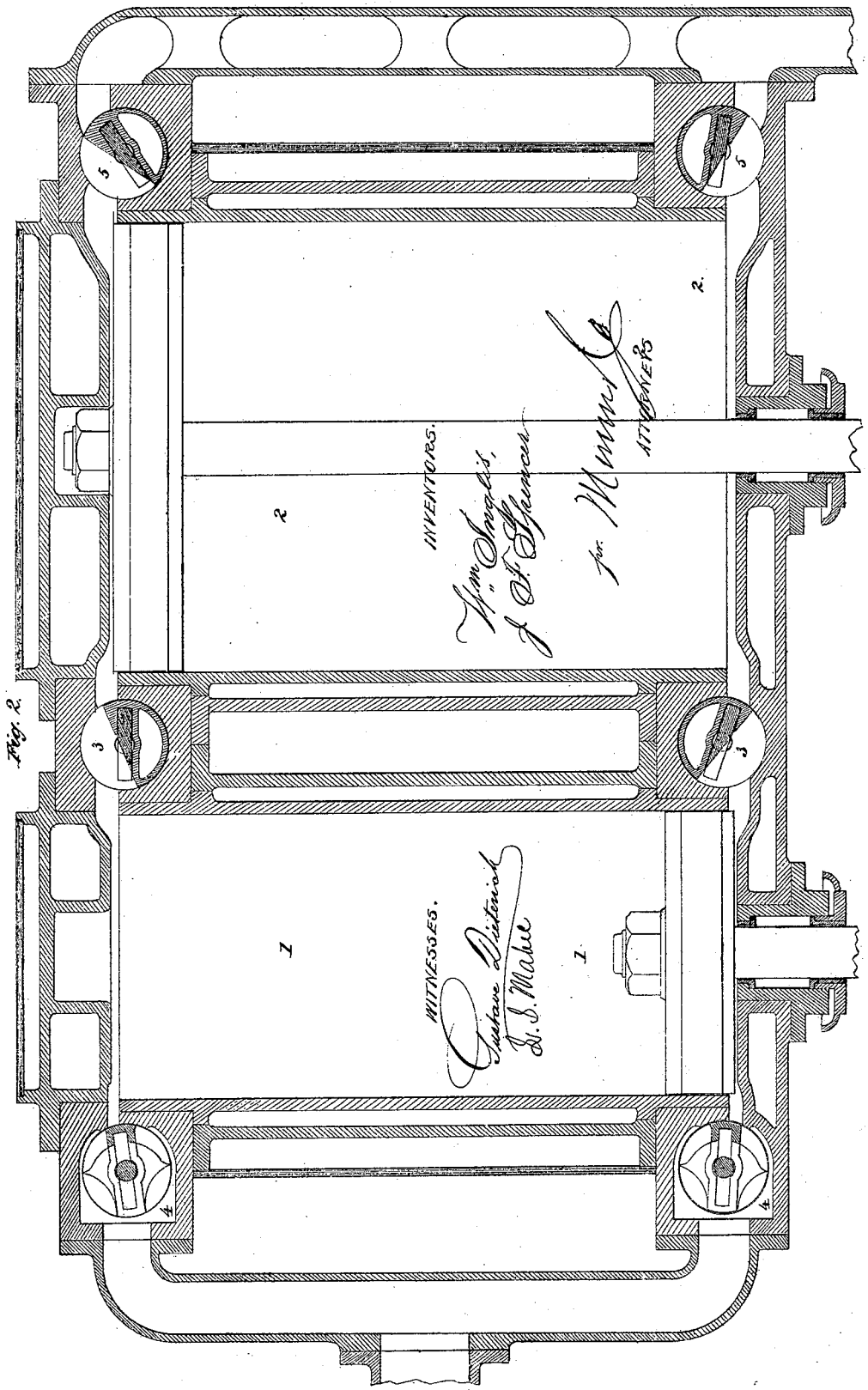

Compound Engine.

No. 107,265. Patented Sep. 13, 1870.

WITNESSES.
Gustave Dieterich
L. S. Mabee

INVENTORS.
Wm. Inglis
J. F. Spencer
per Munn & Co
ATTORNEYS

United States Patent Office.

WILLIAM INGLIS, OF BOLTON, AND JOHN FREDERICK SPENCER, OF LONDON, ENGLAND.

Letters Patent No. 107,265, dated September 13, 1870.

IMPROVEMENT IN STEAM-ENGINES.

The Schedule referred to in these Letters Patent and making part of the same.

To all whom it may concern:

Be it known that we, WILLIAM INGLIS, of Bolton, Lancashire, England, and JOHN FREDERICK SPENCER, of London, England, have invented a new and useful Improvement in Steam-Engines; and we do hereby declare that the following is a full, clear, and exact description thereof, which will enable others skilled in the art to make and use the same, reference being had to the accompanying drawing forming part of this specification.

This invention relates to mechanism for working and liberating the steam-valves, or for working any steam-valves when separate steam and exhaust-ports are used, and the steam-valves liberated, and the closing action or cut-off effected by springs, or their equivalents.

Figure 1 is a side elevation, and

Figure 2 is a sectional view of a compound or high and low-pressure engine, showing one arrangement for the application of the separate cylindrical valves.

Figure 4:
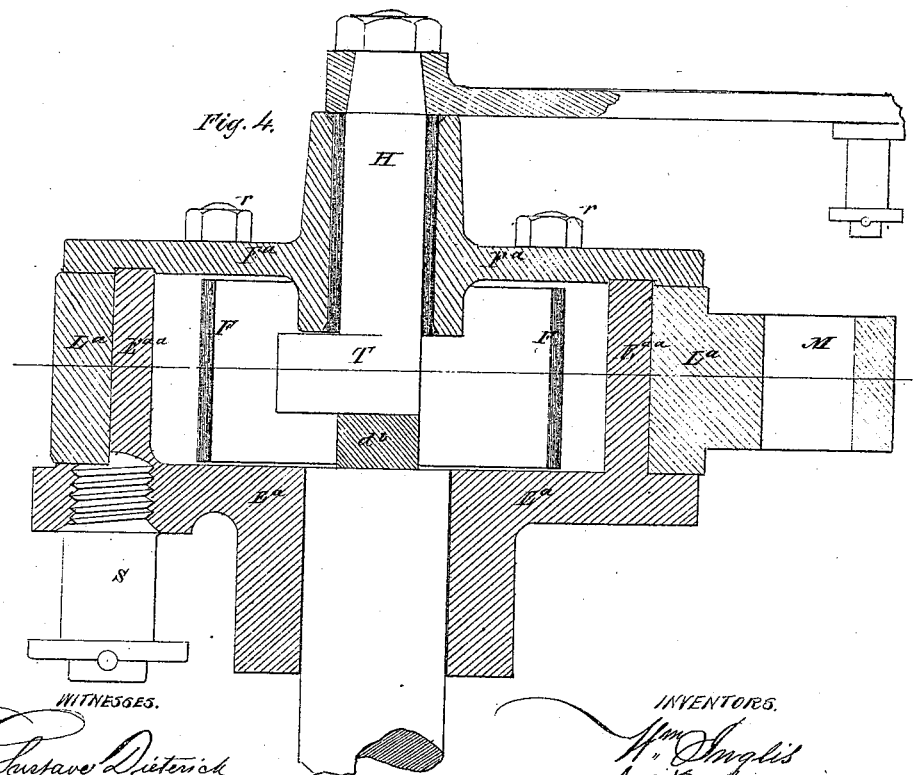
Figures 3 and 4 are lateral and transverse sectional views of one arrangement of our improved escapement gear.

In figs. 1 and 2, merely the cylinders with their immediate connections are shown, and repetitions of some similar parts are indicated by lines.

The same reference numerals are used to mark the same or like parts in all the figures in which they occur.

In this modification the small high-pressure cylinder 1, and large low-pressure cylinder 2 are placed side by side, with their pistons connected to cranks, which are diametrically opposite, or nearly so, but which are not shown in the drawing.

There are six cylindrical valve-chambers, each with its valve, and they are placed with their axes parallel to each other, and at right angles to the plane passing through the axis of the cylinders.

Two of the valves, 3 3, are between the cylinders 1 2, and control the passage of the steam from the small one 1 to the large one 2, while other two, 4 4, for admitting steam, are on the outer side of the small cylinder 1, the remaining two, 5 5, for the exhaust, being on the outer side of the large cylinder 2.

The valves 3 4 5 and their chambers are arranged and fitted like those of the same kind in single-cylinder engines, as will be easily understood from the drawing, and the cylinders are represented as steam-jacketed, and as put together in the manner described in the specification of certain Letters Patent granted to WILLIAM INGLIS, and dated December 22, 1868, No. 85,098.

All six valves may be worked in any convenient way, as, for example, by a single vibrating disk; or the four valves, in connection with either of the cylinders, may be worked by a separate disk or rocking-shaft.

In either arrangement, adjustable liberating gear, such as is used in single engines of the same class, may be applied to the high-pressure valves 4, for effecting the cut-off.

In figs. 1 and 2, two vibrating disks, 6 7, are employed, one, 6, being carried on a stud projecting from the large cylinder 2, and acting by means of plain connecting-rods, indicated by lines 8, in fig 1, on levers on the ends of the spindles 9 of the four valves 3 3 5 5 appertaining to that cylinder.

The other vibrating disk, 7, is carried on a stud projecting from the high-pressure cylinder 1, and acts by connecting-rods 10, connected with liberating gear on the spindles H of the two high-pressure valves 4 4.

In most cases it will be better to impart the vibrating motion to the disks 6 7 from separate eccentrics on the crank-shaft, but in some cases they may be connected together, or be otherwise arranged to be actuated by a single eccentric, or by a single pair of eccentrics.

The motion may be transmitted from the eccentrics to the disks in any convenient manner.

In the improvement in tripping-gear there are for each steam-valve a disk and ring, both placed to vibrate concentrically to the axis of the steam-valve spindle, or to the axis of a weigh-shaft giving motion to the steam-valve. One of these devices, that is, ring and disk, is permanently secured and connected with the usual eccentric and its rods, and the other is permanently connected to the steam-valve rod, or to the axis of a weigh-shaft giving motion to the steam-valve, and also to the spring or weight, or their equivalent, which closes the steam-valve, and both ring and disk are connected together and disengaged at the intervals of time necessary to regulate the cut-off or expansion by detent or escapement gear.

Figure 3:
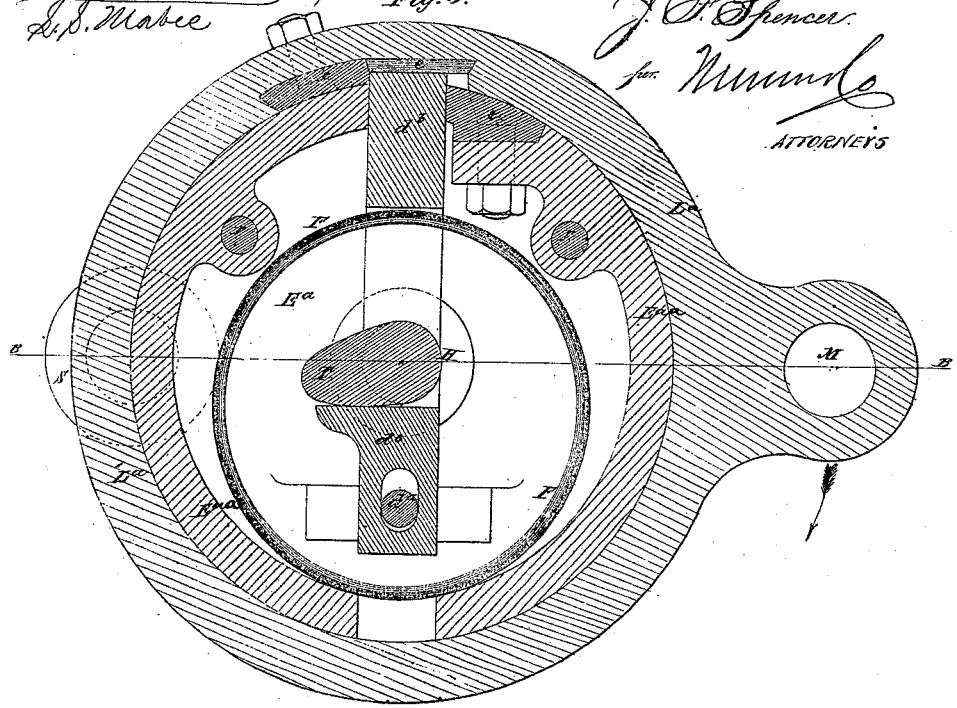

Figs. 3 and 4 show the arrangement of the radial gear.

L$^a$ is a ring, which is connected with wrist-plate 7 by means of the rod 10, which is pivoted to said ring at M.

E$^a$ is a disk, provided with a vertical annular projection, E$^{aa}$, which fits within the ring L$^a$, and is divided or slotted radially on one or two sides.

A pin, $d^c$, projects from the upper side of the disk, and works in a slot of a radially-arranged locking-bar, $d^b$.

This bar is cut out at its middle third to admit the cam T of the shaft H.

An annular spring, F, is arranged to exert a constant pressure outwardly on the bar $d^b$.

$e\ e\ e$ indicate blocks or pieces of metal, the two outer of which are secured respectively to the ring and disk by screws.

The disk $E^a$ is keyed on the valve-spindle, and is connected by the pin S and rod 18 to the dash-pot 15, which, in this instance, contains the spring for closing the valves when liberated.

The ring $L^a$ and disk $E^a$ are intermittently connected by the locking-bar $d^b$ and the cam or trigger T, which last is held stationary by the adjustable rod 19.

The movement of the ring $L^a$ in the direction of the arrow (by an eccentric or crank through the medium of the wrist-plate 7) lifts the locking-bar clear of the ring, the cam riding the shoulder of the bar, and thus releases the disk $E^a$, and allows it and the steam-valve to be acted on by weight or spring in the usual way.

The bar $d^b$ is forced back into the notch in disk $E^a$, when they are brought to coincide by the return movement of the latter by spring F. The two disks then move together in opening the valve.

Other modifications of the detent gear may be adopted without affecting the principle of the radial action of the two distinct parts $E^a$ and $L^a$.

The expansion can be varied by changing the position of the trigger T, which can be effected by the governor or by the hand.

Having thus described our invention,

We claim as new and desire to secure by Letters Patent—

1. The combination of the ring $L^a$, disk $E^a$, locking-bar $d^b$, cam T, and a spring, substantially as shown and described, and for the purpose specified.

2. The combination, with the elements of the above clause, of the wrist-plate or plates, dash-pot, and adjustable stationary rod 19, all arranged to operate as shown and described.

3. The arrangement of the valves 3 3, 4 4, and 5 5, with the high-pressure cylinder 1 and low-pressure cylinder 2, as shown and described, whereby the pistons of the said cylinders move simultaneously in reverse directions, as shown and described.

The above specification of our invention signed by us this 15th day of November, 1869.

WILLIAM INGLIS.
JOHN FREDERICK SPENCER.

Witnesses to the signature of WILLIAM INGLIS:
JOHN JACKSON,
WALTER HARDCASTLE.

Witnesses to the signature of JOHN FREDERICK SPENCER:
GEO. J. B. FRANKLIN,
JOHN GYNNE.